Patented Jan. 9, 1951

2,537,892

UNITED STATES PATENT OFFICE 2,537,892

ESTERS OF 2 - BENZAMIDO - 3 - CARBOXY-METHYLMERCAPTO-PROPANOIC ACID

Stanton A. Harris, Westfield, N. J., assignor to Merck & Co., Inc., Rahway, N. J., a corporation of New Jersey No Drawing. Application September 16, 1944, Serial No. 554,449

2 Claims. (Cl. 260—470)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2 - (4' - carboxy-butyl)-3:4-ureido-tetrahydrothiophene, having the empirical formula $C_{10}H_{16}O_3N_2S$, and the structural formula:

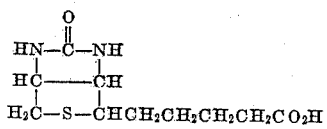

It is now found that this compound can be synthesized by reactions indicated as follows:

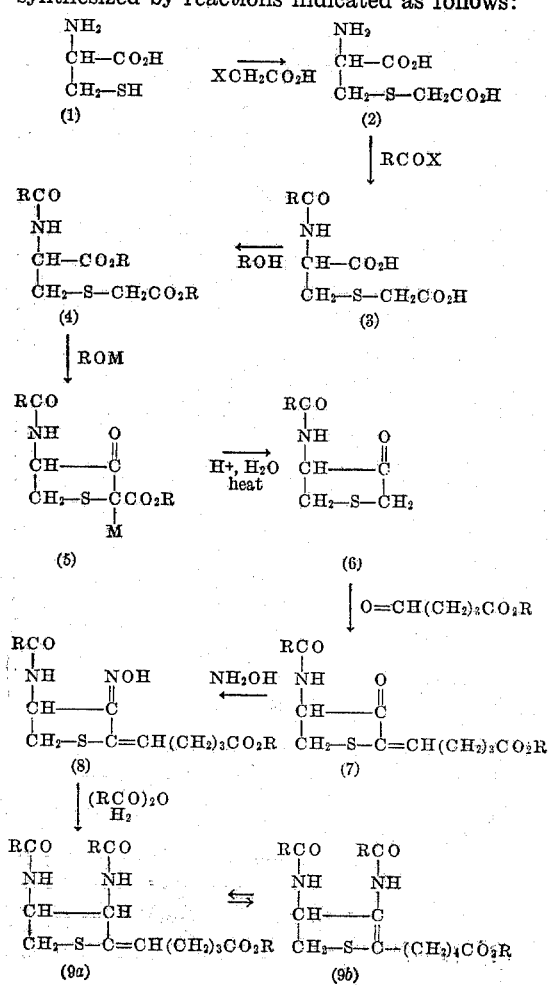

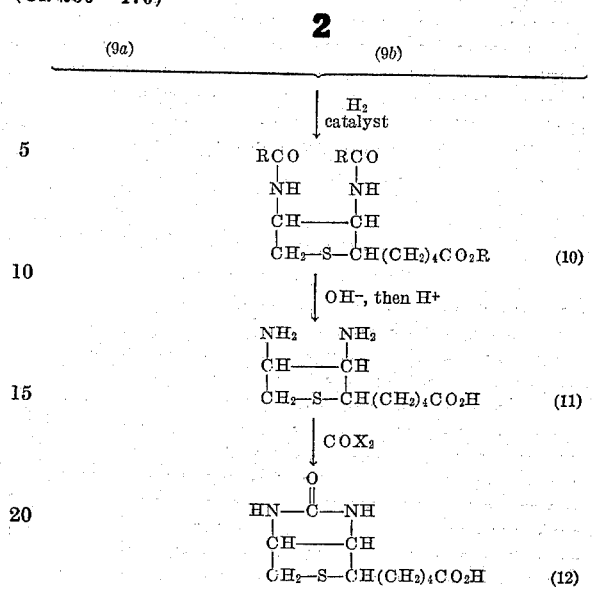

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxymethylmercapto - propanoic acid (2); which is then treated with an acylating agent, such as an acyl halide, in an aqueous alkaline solution to yield 2-acylamido-3-carboxymethyl-mercapto-propanoic acid (3). This product is esterified using a mineral acid catalyst, to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3 - keto - 4 - acylamido - terahydrothiophene (6) which, when reacted with 4-carboxy-butanal ester in a lower aliphatic alcohol reaction medium containing piperidine and a lower aliphatic carboxylic acid, produces 2-(4'-carboalkoxy-butyl-idene) - 3 - keto - 4 - acylamido - tetrahydrothiophene (7). This product, when reacted with hydroxylamine yields an ester of the corresponding oxime, 2 - (4' - carboxy - butylidene) - 3 - isonitroso - 4 - acylamido - tetrahydrothiophene (8) which upon treatment with a mixture of zinc, a lower aliphatic acid and a lower aliphatic acid anhydride, produces an equilibrium mixture of 2 - (4' - carboxy - butylidene) - 3:4 - di(acylamido) - tetrahydrothiophene ester (9a) and 2 - (4' - carboxy - butyl) - 3:4 - di(acylamido) - 4:5 - dihydrothiophene ester (9b). This equilibrium mixture, or if preferred, one of the equilibrants, is then treated with hydrogen in the presence of a hydrogenation catalyst to yield 2-(4'-carboxy - butyl) - 3:4 - di(acylamido) - tetrahydrothiophene ester (10). When this last mentioned compound is treated with an aqueous alkaline solution, hydrolysis of the acyl groups occurs, yielding upon acidification, 2-(4'-carboxybutyl) - 3:4 - diamino - tetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

The present invention is concerned with the intermediates 3 and 4 above, 2-acylamido-3-carboxymethylmercapto-propanoic acid and esters thereof, represented by the formula:

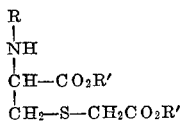

wherein R is an acyl, and R' is hydrogen or an alkyl, aryl or arylalkyl group.

The above intermediate compounds are converted into the vitamin biotin by the process steps above indicated as described in detail in concurrently filed applications, Serial Nos. 554,450, 554,451, now Patent No. 2,508,457; 554,-452, now Patent No. 2,452,653; 554,453, now Patent No. 2,460,224; 554,454, now Patent No. 2,459,-817; 554,455, now Patent No. 2,487,050; 554,456, now abandoned, and 554,457, now abandoned.

According to this invention these compounds are obtained by treating 2-amino-3-carboxymethylmercapto-propanoic acid (2), obtained as described in J. Biol. Chem., 106, 331, (1934), with an acylating agent, such as an acetyl or propionyl halide, benzoyl chloride or the like to form the acylamido compound (3) and esterifying this compound by reaction with an alcohol in the presence of an acid to obtain the diester (4). It is presently preferred to conduct the above mentioned acylation reaction in an alkaline aqueous medium at a temperature of the order of 20° C.

The following examples illustrate a method of carrying out the present invention, but it is to be understood that these examples are given by way of illustration and not of limitation.

*Example 1*

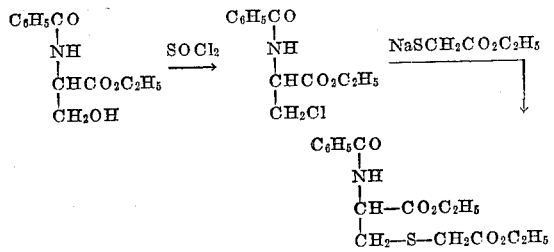

About 1.3 g. of the ethyl ester of 2-benzamido-3-hydroxy-propanoic acid (which can be prepared by reacting 2-amino-3-hydroxy-propanoic acid with benzoyl chloride in presence of an alkali, followed by esterification) is suspended in benzene, about 0.4 cc. of pyridine is added followed by approximately 0.6 cc. of thionyl chloride, and the mixture is heated on a steam bath for about 20 minutes, then cooled. It is washed with water, dilute hydrochloric acid, dilute sodium bicarbonate solution, again with water; the benzene is removed in vacuo and the residue is crystallized from ether and petroleum ether, yielding the product: ethyl ester of 2-benzamido-3-chloro-propanoic acid (M. P. 90.5–91° C.). About 1.8 g. of this ester dissolved in a little alcohol is added to a solution formed by dissolving about .16 g. of sodium in absolute ethanol and adding 0.85 g. of ethyl thioglycolate, and the mixture is heated on a steam bath for about 20 minutes or until neutral (using litmus indicator), then it is filtered, the alcohol is removed in vacuo, the residue is taken up in ether, filtered, the ether is distilled and an oily residue is obtained comprising the diethyl ester of 2-benzamido - 3 - carboxymethylmercapto - propanoic acid. When treated with sodium ethoxide ring closure is effected and, upon decarboxylation by heating with an aqueous acid, 3-keto-4-benzamido-tetrahydrothiophene (intermediate 6 above) is obtained.

In like manner by using as starting materials the methyl or propyl esters of 2-benzamido-3-hydroxy-propanoic acid with ethyl thioglycolate corresponding mixed diesters can be obtained or if preferred corresponding esters of thioglycolic acid can be used to produce corresponding diesters having the same alkyl groups.

*Example 2*

A

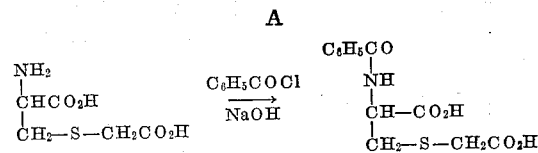

About 150 g. of 2-amino-3-carboxymethylmercapto-propanoic acid, dissolved in a solution of 175 g. of sodium hydroxide in 1500 cc. of water, is cooled to a temperature of below 20° C., and approximately 196 cc. of benzoyl chloride are added slowly with agitation while maintaining the temperature substantially constant. After all the benzoylchloride has been added, the mixture is allowed to warm to room temperature, then it is added to about 365 cc. of cold hydrochloric acid, causing separation of a solid which is removed by extraction with ether. The ether extracts are evaporated, yielding a residue containing 2-benzamido-3-carboxymethylmercapto-propanoic acid (M. P. 139–140° C.) which is extracted with benzine to remove impurities.

In like manner 2-amino-3-carboxymethylmercapto-propanoic acid can be treated with acetyl or propionyl chloride to obtain the corresponding acetylamido or propionylamido compound, or the amino acid can be reacted with other acyl halides to produce corresponding acylamido compounds.

B

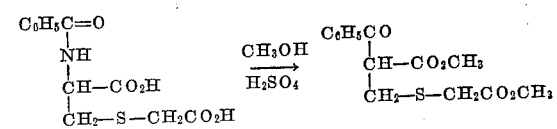

A mixture of about 475 g. of 2-benzamido-3-carboxymethylmercapto-propanoic acid, 1000 cc. of methanol, and 10 cc. of sulfuric acid is refluxed for about five hours, then cooled and about 3 l. of water is added. The aqueous layer is separated, extracted with benzene, and the extracts are combined with non-aqueous layer, washed with water, sodium bicarbonate solution and again with water, dried with sodium sulfate, and concentrated to obtain the dimethyl ester of 2 - benzamido - 3 - carboxymethylmercapto - propanoic acid (M. P. 62–63° C.).

In like manner the acylamido-dicarboxylic acid can be reacted with other alcohols, for example with propanol or benzyl alcohol to obtain the di-propyl or di-benzyl esters, or with ethanol to obtain the ethyl ester. It will also be apparent to those versed in this art that in like manner other acyl derivatives of 2-amino-3-carboxymethylmercapto-propanoic acid, for example the acetylamido or propionylamido compounds, can be esterified as described to form corresponding di-esters.

Modifications may be made in carrying out the present invention without departing from the spirit and scope thereof and the invention is to be limited only by the appended claims.

What is claimed is:

1. As a new compound, 2-benzamido-3-carboxymethylmercapto-propanoic dimethyl ester.
2. Lower dialkyl esters of 2-benzamido-3-carboxymethylmercaptopropanoic acid.

STANTON A. HARRIS.

REFERENCES CITED

The following references are of record in the file of this patent:

FOREIGN PATENTS

| Number | Country | Date |
| --- | --- | --- |
| 66,563 | Norway | Aug. 2, 1943 |

OTHER REFERENCES

Bergmann et al.: "Zeit. Physiol. Chem.," vol. 140, pp. 128–145 (1924).

Karrer et al.: "Helvetica Chim. Acta," vol. 9, pp. 301–323 (1926).

Micaelis et al.: "J. Biol. Chem.," vol. 106, pp. 331–341 (1934).

F. R. Blood et al.: Jr. of Biol. Chemistry, pp. 407–412, May 1941.